(12) United States Patent
Glugla et al.

(10) Patent No.: US 8,176,893 B2
(45) Date of Patent: May 15, 2012

(54) ENGINE COMBUSTION CONTROL USING ION SENSE FEEDBACK (75) Inventors: Chris Paul Glugla, Macomb, MI (US); Daniel Lawrence Meyer, Dearborn, MI (US); Phil William Husak, Southgate, MI (US); Kelvin Lee Dobbins, Dearborn, MI (US); Michael Damian Czekala, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 706 days.

(21) Appl. No.: 12/202,231

(22) Filed: Aug. 30, 2008

(65) Prior Publication Data

US 2010/0057327 A1    Mar. 4, 2010

(51) Int. Cl.
    *F02P 15/02* (2006.01)
    *F02P 5/00* (2006.01)
(52) U.S. Cl. .................. 123/310; 123/406.26; 701/114; 701/115
(58) Field of Classification Search ............. 123/406.19, 123/406.24, 406.26, 305, 310; 73/114.67; 701/102, 114, 115
    See application file for complete search history.

(56) References Cited

U.S. PATENT DOCUMENTS

| | | | | |
|---|---|---|---|---|
| 4,233,943 A * | 11/1980 | Rogora et al. | ............ | 123/406.26 |
| 4,377,140 A * | 3/1983 | Latsch | ................. | 123/406.26 |
| 4,592,315 A * | 6/1986 | Kobayashi et al. | ............ | 123/308 |
| 4,648,367 A * | 3/1987 | Gillbrand et al. | ........ | 123/406.26 |
| 4,753,200 A * | 6/1988 | Kawamura et al. | ...... | 123/188.14 |
| 5,003,945 A * | 4/1991 | Hoeptner | ....................... | 123/310 |
| 5,050,556 A * | 9/1991 | Williams et al. | ......... | 123/406.28 |
| 5,087,882 A * | 2/1992 | Iwata | .............................. | 324/388 |
| 5,247,919 A | 9/1993 | Akaki et al. | | |
| 5,425,339 A | 6/1995 | Fukui | | |
| 5,738,074 A * | 4/1998 | Nakamura et al. | ............. | 123/305 |
| 5,954,024 A * | 9/1999 | Duhr et al. | ..................... | 123/310 |
| 6,155,241 A | 12/2000 | Hohner et al. | | |
| 6,246,952 B1 | 6/2001 | Honda | | |
| 6,499,460 B2 * | 12/2002 | Suzuki et al. | ................. | 123/310 |
| 6,520,149 B2 | 2/2003 | Kokubo et al. | | |
| 6,536,406 B2 * | 3/2003 | Matsubara et al. | ........... | 123/310 |

(Continued)

FOREIGN PATENT DOCUMENTS

GB    2396754 A    6/2004

OTHER PUBLICATIONS

Yutaka Ohashi et al., The Application of Ionic Current Detection System for the Combustion Condition Control, SAE 1999-01-0550, Mar. 1-4, 1999.

(Continued)

*Primary Examiner* — Thomas Moulis
(74) *Attorney, Agent, or Firm* — Julia Voutyras; Brooks Kushman P.C.

(57) ABSTRACT

A system and method for operating an engine having at least two spark plugs per cylinder include controlling at least one actuator to alter combustion within a selected cylinder such that the combustion burn rate determined by ion sense current signals associated with the at least two spark plugs of the selected cylinder approaches a desired combustion burn rate. A desired combustion burn rate is determined based on current engine/vehicle operating and ambient conditions with ion sense signals from each spark plug analyzed to determine combustion timing relative to corresponding ignition timing. Ignition timing and/or other actuators are controlled in response to provide a desired combustion burn rate.

18 Claims, 4 Drawing Sheets

U.S. PATENT DOCUMENTS

| | | | |
|---|---|---|---|
| 6,550,312 B1 * | 4/2003 | Hohner et al. | 73/35.08 |
| 6,748,922 B2 | 6/2004 | Uchida et al. | |
| 6,752,004 B2 * | 6/2004 | Inada et al. | 73/35.08 |
| 6,805,099 B2 * | 10/2004 | Malaczynski et al. | 123/435 |
| 6,813,933 B1 * | 11/2004 | Ketterer et al. | 73/35.08 |
| 6,883,509 B2 | 4/2005 | Porter et al. | |
| 6,886,547 B2 | 5/2005 | Butler, Jr. | |
| 6,910,449 B2 | 6/2005 | Strom et al. | |
| 6,922,628 B2 | 7/2005 | Zhu et al. | |
| 6,935,302 B2 * | 8/2005 | Kashiwagura et al. | 123/295 |
| 6,945,229 B1 | 9/2005 | Zhu et al. | |
| 6,951,201 B2 | 10/2005 | Zhu et al. | |
| 7,005,855 B2 | 2/2006 | Zhu et al. | |
| 7,059,296 B2 | 6/2006 | Strom et al. | |
| 7,063,079 B2 * | 6/2006 | Huberts et al. | 123/630 |
| 7,086,382 B2 | 8/2006 | Daniels et al. | |
| 7,156,070 B2 | 1/2007 | Strom et al. | |
| 7,251,557 B2 | 7/2007 | Strom et al. | |
| 7,255,080 B1 | 8/2007 | Leone | |
| 7,290,442 B2 * | 11/2007 | Zhu et al. | 73/114.67 |
| 7,677,230 B2 * | 3/2010 | Meyer et al. | 123/638 |
| 7,690,352 B2 * | 4/2010 | Zhu et al. | 123/406.14 |
| 7,856,959 B2 * | 12/2010 | VanDyne et al. | 123/435 |
| 2004/0083717 A1 | 5/2004 | Zhu et al. | |
| 2004/0083794 A1 | 5/2004 | Zhu et al. | |
| 2004/0084018 A1 | 5/2004 | Zhu et al. | |
| 2004/0084019 A1 | 5/2004 | Zhu et al. | |
| 2004/0084025 A1 | 5/2004 | Zhu et al. | |
| 2004/0084026 A1 | 5/2004 | Zhu et al. | |
| 2004/0084034 A1 | 5/2004 | Huberts et al. | |
| 2004/0084035 A1 | 5/2004 | Newton | |
| 2004/0085068 A1 | 5/2004 | Zhu et al. | |
| 2004/0085069 A1 | 5/2004 | Zhu et al. | |
| 2004/0085070 A1 | 5/2004 | Daniels et al. | |
| 2004/0088102 A1 | 5/2004 | Daniels et al. | |
| 2005/0028786 A1 | 2/2005 | Zhu et al. | |
| 2005/0050948 A1 | 3/2005 | Zhu et al. | |
| 2005/0055169 A1 | 3/2005 | Zhu et al. | |
| 2005/0090966 A1 | 4/2005 | Strom et al. | |
| 2005/0126537 A1 | 6/2005 | Daniels et al. | |
| 2005/0211219 A1 | 9/2005 | Strom et al. | |
| 2005/0247064 A1 | 11/2005 | Lieuwen | |
| 2006/0042355 A1 | 3/2006 | Zhu et al. | |
| 2006/0241848 A1 | 10/2006 | Strom et al. | |
| 2007/0079817 A1 | 4/2007 | VanDyne et al. | |
| 2007/0095326 A1 | 5/2007 | Strom et al. | |
| 2007/0215101 A1 | 9/2007 | Russell et al. | |
| 2007/0215102 A1 | 9/2007 | Russell et al. | |
| 2007/0215104 A1 | 9/2007 | Hahn | |
| 2007/0215107 A1 | 9/2007 | Shelby et al. | |
| 2007/0215111 A1 | 9/2007 | Surnilla | |
| 2007/0215130 A1 | 9/2007 | Shelby et al. | |

OTHER PUBLICATIONS

Schneider et al., Real-Time Air/Fuel-Ration Control in a Small SI Engine Using the Ionic Current Signal, SAE 1999-01-3323, JSAE 9938078, Sep. 28-30, 1999.

Wilstermann et al., Ignition System Integrated AC Ion Current Sensing for Robust and Reliable Online Engine Control, SAE 2000-01-0553, Mar. 6-9, 2000.

Schneider et al., An Investigation of the Impact of Cycle-to-Cycle Variations on the Ionic Current Signal in SI Engines, SAE 2000-01-1943, Jun. 19-22, 2000.

Toon de Bie, et al. A Novel Start Algorithm for CNG Engines Using Ion Sense Technology, SAE 2000-01-2800, Oct. 16-19, 2000.

Noriaki Kondo, et al., Combustion Monitoring by use of the Spark Plug for DI Engine, SAE 2001-01-0994, Mar. 5-8, 2001.

Yoshiyama, et al., Combustion Diagnostics of a Spark Ignition Engine Using a Spark Plug as an Ion Probe, SAE 2002-01-2838, Oct. 21-24, 2002.

Malaczynski, et al., Real-Time Digital Signal Processing of Ionization Current for Engine Diagnostic and Control, SAE 2003-01-1119, Mar. 3-6, 2003.

Strandh, et al., Ion Current Sensing for HCCI Combustion Feedback, SAE 2003-01-3216, 2003.

Huang, et al., Effects of Engine Operating Conditions on In-Cylinder Air/Fuel Ratio Detection Using a Production Ion Sensing Device, SAE 2004-01-0515, Mar. 8-11, 2004.

Vressner, et al., Multiple Point Ion Current Diagnostics in an HCCI Engine, SAE 2004-01-0934, Mar. 8-11, 2004.

Shimasaki, et al., Study on Combustion Monitoring System for Formula One Engines Using Ionic Current Measurement, SAE 2004-01-1921, Jun. 8-10, 2004.

Huang, Yiqun, et al., Investigation of an In-cylinder Ion Sensing Assisted HCCI Control Strategy, SAE2005-01-0068, Apr. 11-14, 2005.

Vressner, et al., Fuel Effects on Ion Current in an HCCI Engine, SAE 2005-01-2093, 2005.

Yoshiyama, et al., Ion Current During the Exhaust Process Under the Idling Condition in a Spark Ignition Engine, SAE 2005-01-3872, Oct. 24-27, 2005.

Rado, et al., Significance of Burn Types, as Measured by Using the Spark Plugs as Ionization Probes, with Respect to the Hydrocarbon Emission Levels in S.I. Engines, SAE 750354, Feb. 24-28, 1975.

Saltzkoff, et al., An Ionization Equilibrium Analysis of the Spark Plug as an Ionization Sensor, SAE960337, Feb. 26-29, 1996.

Fei An, et al., Combustion Diagnostics in Methane-Fueled SI Engines Using the Spark Plug as an Ionization Probe, SAE970033, Feb. 24-27, 1997.

Eriksson, et al., Closed Loop Ignition Control by Ionization Current Interpretation, SAE 970854, Feb. 24-27, 1997.

Reinmann, et al., Local Air-Fuel Ratio Measurements Using the Spark Plug as an Ionization Sensor, SAE 970856, Feb. 24-27, 1997.

Saltzkoff, et al., In-Cylinder Pressure Measurements Using the Spark Plug as an Ionization Sensor, SAE 970857, Feb. 24-27, 1997.

Asano, et al., Development of New Ion Current Combustion Control System, SAE 980162, Feb. 23-26, 1998.

Balles, et al., In-Cylinder Air/Fuel Ratio Approximation Using Spark Gap Ionization Sensing, SAE 980166, Feb. 23-26, 1998.

Ohashi, et al., The Application of Ionic Current Detection System for the Combustion Limit Control, SAE 980171, Feb. 23-26, 1998.

Schneider, et al., An Investigation of the Impact of Cycle-to-cycle Variations on the Ionic Current Signal in SI Engines, SAE 2000-01-1943, Jun. 19-22, 2000.

* cited by examiner

ENGINE COMBUSTION CONTROL USING ION SENSE FEEDBACK

BACKGROUND

1. Technical Field

The present disclosure relates to systems and methods for controlling an internal combustion engine having at least one spark plug per cylinder with individual plug control and ionization current sensing.

2. Background Art

Manufacturers continue to improve control of internal combustion engines to enhance fuel economy and performance while reducing emissions using more sophisticated sensing and processing hardware and software. To improve control of the combustion process, ionization current sensing (or ion sense) uses a bias voltage applied across a sensor positioned within the combustion chamber to generate a current signal indicative of the combustion quality and timing. For spark-ignition engines, one or more spark plugs may be used as an ion sensor with the bias voltage applied across the air gap of the spark plug, or between a spark plug electrode and the cylinder wall.

One strategy to reduce emissions and improve fuel economy in spark-ignited gasoline fuel-injected internal combustion engines is to increase the combustion burn rate. The faster combustion is helpful to avoid knock and to tolerate larger amounts of exhaust gas recirculation (EGR), which lowers combustion temperatures and generation of oxides of nitrogen (NOx). Additionally, fast burn is desirable for better combustion stability, effectively reducing noise, vibration, and harshness (NVH). For certain combustion chambers, multiple spark plugs may be employed to facilitate fast burn. However, uncontrolled burn rates can result in harsh combustion, which may lead to consumer dissatisfaction. Combustion stability, even with multiple spark plugs, is often difficult to achieve in fast-burn applications. As such, it is desirable to control the combustion process to provide fast-burn combustion stability while avoiding combustion conditions that may be objectionable to vehicle occupants.

SUMMARY

A system and method for operating a multiple cylinder internal combustion engine having at least two spark plugs per cylinder include controlling at least one actuator to alter combustion within a selected cylinder such that the combustion burn rate determined by ion sense current signals associated with the at least two spark plugs of the selected cylinder approaches a desired combustion burn rate.

In one embodiment, a multiple cylinder internal combustion engine includes two spark plugs per cylinder in communication with a controller to provide individual spark control and individual ionization current sensing for each spark plug. The controller determines a desired combustion burn rate based on current engine/vehicle operating and ambient conditions and analyzes ion sense signals from each spark plug to determine combustion timing relative to corresponding ignition timing for each spark plug. The relative combustion timing for each spark plug associated with a particular cylinder is used to infer the actual combustion burn rate of the cylinder and at least one actuator affecting combustion is controlled so that the inferred or indicated combustion burn rate approaches the desired combustion burn rate. In various embodiments actuators affecting combustion include charge motion (or swirl) control valves, fuel injectors, throttle valve, exhaust gas recirculation (EGR) valve, variable valve timing devices, and variable cam timing devices in addition to the spark plugs. When using one or more spark plugs as actuators that affect combustion, the controller may modify spark plug ignition timing and the number of sparks per spark plug per combustion cycle to achieve a desired combustion profile or burn rate.

The present disclosure includes embodiments having various advantages. For example, the systems and methods of the present disclosure use ionization sensing feedback to more accurately control combustion within individual cylinders to manage fuel economy, performance, and emissions with acceptable NVH.

The above advantages and other advantages and features will be readily apparent from the following detailed description of the preferred embodiments when taken in connection with the accompanying drawings.

DETAILED DESCRIPTION OF THE DRAWINGS

DETAILED DESCRIPTION OF EMBODIMENT(S)

As those of ordinary skill in the art will understand, various features of the embodiments illustrated and described with reference to any one of the Figures may be combined with features illustrated in one or more other Figures to produce embodiments that are not explicitly illustrated or described. The combinations of features illustrated provide representative embodiments for typical applications. However, various combinations and modifications of the features consistent with the teachings of the present disclosure may be desired for particular applications or implementations. The representative embodiments used in the illustrations relate generally to a multi-cylinder, internal combustion engine having at least two spark plugs per cylinder that also function as ionization sensors. Those of ordinary skill in the art may recognize similar applications or implementations with other engine/vehicle technologies.

Figure 1:
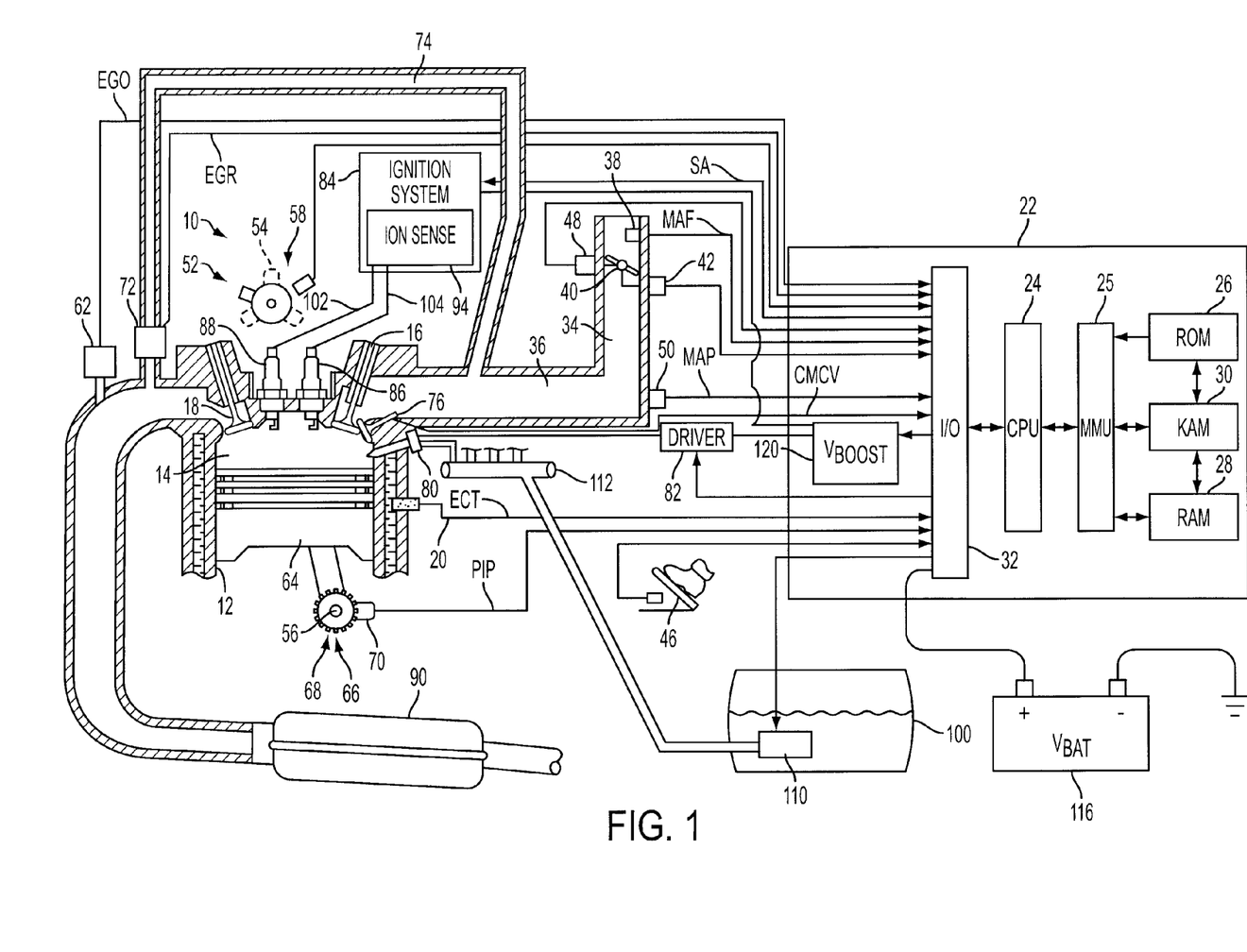
FIG. 1 is a block diagram illustrating operation of a system or method for controlling combustion using ionization sensing feedback according to one embodiment of the present disclosure.

System 10 includes an internal combustion engine having a plurality of cylinders, represented by cylinder 12, with corresponding combustion chambers 14. As one of ordinary skill in the art will appreciate, system 10 includes various sensors and actuators to effect control of the engine. A single sensor or actuator may be provided for the engine, or one or more sensors or actuators may be provided for each cylinder 12, with a representative actuator or sensor illustrated and described. For example, each cylinder 12 may include four actuators that operate intake valves 16 and exhaust valves 18 for each cylinder in a multiple cylinder engine. However, the engine may include only a single engine coolant temperature sensor 20.

Controller 22, sometimes referred to as an engine control module (ECM), powertrain control module (PCM) or vehicle control module (VCM), has a microprocessor 24, which is part of a central processing unit (CPU), in communication with memory management unit (MMU) 25. MMU 25 controls the movement of data among various computer readable storage media and communicates data to and from CPU 24. The computer readable storage media preferably include volatile and nonvolatile storage in read-only memory (ROM) 26, random-access memory (RAM) 28, and keep-alive memory (KAM) 30, for example. KAM 30 may be used to store various operating variables while CPU 24 is powered down. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by CPU 24 in controlling the engine or vehicle into which the engine is mounted. The computer-readable storage media may also include floppy disks, CD-ROMs, hard disks, and the like.

In one embodiment, the computer readable storage media include stored data or code representing instructions executable by controller 22 to control a multiple cylinder internal combustion engine having at least two spark plugs per cylinder. The code includes instructions that actuate or control at least one actuator affecting combustion within at least one cylinder 12 based on ionization sensing feedback of at least one previous combustion cycle to control combustion burn rate within the at least one cylinder 12 as described in greater detail herein.

System 10 includes an electrical system powered at least in part by a battery 116 providing a nominal voltage, $V_{BAT}$, which is typically either 12V or 24V, to power controller 22. As will be appreciated by those of ordinary skill in the art, the nominal voltage is an average design voltage with the actual steady-state and transient voltage provided by the battery varying in response to various ambient and operating conditions that may include the age, temperature, state of charge, and load on the battery, for example. Power for various engine/vehicle accessories may be supplemented by an alternator/generator during engine operation as well known in the art. A high-voltage power supply 120 may be provided in applications using direct injection and/or to provide the bias voltage for ion current sensing. Alternatively, ion sensing circuitry may be used to generate the bias voltage using the ignition coil and/or a capacitive discharge circuit as known.

In applications having a separate high-voltage power supply, power supply 120 generates a boosted nominal voltage, $V_{BOOST}$, relative to the nominal battery voltage and may be in the range of 85V-100V, for example, depending upon the particular application and implementation. Power supply 120 may be used to power fuel injectors 80 and one or more ionization sensors, which may be implemented by spark plugs 86, 88. As illustrated in the embodiment of FIG. 1, the high-voltage power supply 120 may be integrated with control module 22. Alternatively, an external high-voltage power supply may be provided if desired. Although illustrated as a single functional block in FIG. 1, some applications may have multiple internal or external high-voltage power supplies 120 that each service components associated with one or more cylinders or cylinder banks, for example.

CPU 24 communicates with various sensors and actuators affecting combustion within cylinder 14 via an input/output (I/O) interface 32. Interface 32 may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to CPU 24. Examples of items that may be actuated under control of CPU 24, through I/O interface 32, are fuel injection timing, fuel injection rate, fuel injection duration, throttle valve position, spark plug ignition timing, ionization current sensing and conditioning, charge motion control, valve timing, exhaust gas recirculation, and others. Sensors communicating input through I/O interface 32 may indicate piston position, engine rotational speed, vehicle speed, coolant temperature, intake manifold pressure, accelerator pedal position, throttle valve position, air temperature, exhaust temperature, exhaust air to fuel ratio, exhaust constituent concentration, and air flow, for example. Some controller architectures do not contain an MMU 25. If no MMU 25 is employed, CPU 24 manages data and connects directly to ROM 26, RAM 28, and KAM 30. Of course, more than one CPU 24 may be used to provide engine control and controller 22 may contain multiple ROM 26, RAM 28, and KAM 30 coupled to MMU 25 or CPU 24 depending upon the particular application.

In operation, air passes through intake 34 and is distributed to the plurality of cylinders via an intake manifold, indicated generally by reference numeral 36. System 10 preferably includes a mass airflow sensor 38 that provides a corresponding signal (MAF) to controller 22 indicative of the mass airflow. A throttle valve 40 may be used to modulate the airflow through intake 34. Throttle valve 40 is preferably electronically controlled by an appropriate actuator 42 based on a corresponding throttle position signal generated by controller 22. The throttle position signal may be generated in response to a corresponding engine output or demanded torque indicated by an operator via accelerator pedal 46. A throttle position sensor 48 provides a feedback signal (TP) to controller 22 indicative of the actual position of throttle valve 40 to implement closed loop control of throttle valve 40.

A manifold absolute pressure sensor 50 is used to provide a signal (MAP) indicative of the manifold pressure to controller 22. Air passing through intake manifold 36 enters combustion chamber 14 through appropriate control of one or more intake valves 16. Intake valves 16 and exhaust valves 18 may be controlled using a conventional camshaft arrangement, indicated generally by reference numeral 52. Camshaft arrangement 52 includes a camshaft 54 that completes one revolution per combustion or engine cycle, which requires two revolutions of crankshaft 56 for a four-stroke engine, such that camshaft 54 rotates at half the speed of crankshaft 56. Rotation of camshaft 54 (or controller 22 in a variable cam timing or camless engine application) controls one or more exhaust valves 18 to exhaust the combusted air/fuel mixture through an exhaust manifold. A portion of the exhaust gas may be redirected by exhaust gas recirculation (EGR) valve 72 through an EGR circuit 74 to intake 36. EGR valve 72 may be controlled by controller 22 to control the amount of EGR based on current operating and ambient conditions to provide a desired combustion burn rate as described in greater detail herein.

A sensor 58 provides a signal from which the rotational position of the camshaft can be determined. Cylinder identification sensor 58 may include a single-tooth or multi-tooth sensor wheel that rotates with camshaft 54 and whose rotation is detected by a Hall effect or variable reluctance sensor. Cylinder identification sensor 58 may be used to identify with certainty the position of a designated piston 64 within cylinder 12 for use in determining fueling, ignition timing, or ion sensing, for example.

Additional rotational position information for controlling the engine is provided by a crankshaft position sensor 66 that includes a toothed wheel 68 and an associated sensor 70.

An exhaust gas oxygen sensor 62 provides a signal (EGO) to controller 22 indicative of whether the exhaust gasses are lean or rich of stoichiometry. Depending upon the particular application, sensor 62 may by implemented by a HEGO sensor or similar device that provides a two-state signal corresponding to a rich or lean condition. Alternatively, sensor 62 may be implemented by a UEGO sensor or other device that provides a signal proportional to the stoichiometry of the exhaust feedgas. This signal may be used to adjust the air/fuel ratio, or control the operating mode of one or more cylinders, for example. The exhaust feedgas is passed through the exhaust manifold and one or more emission control or treatment devices 90 before being exhausted to atmosphere.

A fuel delivery system includes a fuel tank 100 with a fuel pump 110 for supplying fuel to a common fuel rail 112 that supplies injectors 80 with pressurized fuel. In some direct-injection applications, a camshaft-driven high-pressure fuel pump (not shown) may be used in combination with a low-pressure fuel pump 110 to provide a desired fuel pressure within fuel rail 112. Fuel pressure may be controlled within a predetermined operating range by a corresponding signal from controller 22. In the representative embodiment illustrated in FIG. 1, fuel injector 80 is side-mounted on the intake side of combustion chamber 14, typically between intake valves 16, and injects fuel directly into combustion chamber 14 in response to a command signal from controller 22 processed by driver 82. Of course, the present disclosure may also be applied to applications having fuel injector 80 centrally mounted through the top or roof of cylinder 14, or with a port-injected configuration, for example.

Driver 82 may include various circuitry and/or electronics to selectively supply power from high-voltage power supply 120 to actuate a solenoid associated with fuel injector 80 and may be associated with an individual fuel injector 80 or multiple fuel injectors, depending on the particular application and implementation. Although illustrated and described with respect to a direct-injection application where fuel injectors often require high-voltage actuation, those of ordinary skill in the art will recognize that the teachings of the present disclosure may also be applied to applications that use port injection or combination strategies with multiple injectors per cylinder and/or multiple fuel injections per cycle.

In the embodiment of FIG. 1, fuel injector 80 injects a quantity of fuel directly into combustion chamber 14 in one or more injection events for a single engine cycle based on the current operating mode in response to a signal (fpw) generated by controller 22 and processed and powered by driver 82. At the appropriate time during the combustion cycle, controller 22 generates signals (SA) processed by ignition system 84 to individually control at least two spark plugs 86, 88 associated with a single cylinder 12 during the power stroke of the cylinder to initiate combustion at a desired combustion burn rate within chamber 14. Controller 22 subsequently applies a high-voltage bias across the at least two spark plugs 86, 88 to enable ionization signal sensing to provide combustion burn rate feedback. Depending upon the particular application, the high-voltage bias may be applied across the spark (air) gap or between the center electrode of spark plug 86, 88 and the wall of cylinder 12. Ignition system 84 may include one or more ignition coils with each ignition coil having a primary winding and one or more secondary windings to efficiently control multiple spark plugs and provide the same polarity signal to each spark plug of a particular cylinder 12. Charging of the ignition coil may be powered by high-voltage power supply 120 or by battery voltage depending upon the particular application and implementation.

As shown in FIG. 1, ignition system 84 may include an ion sense circuit 94 associated with one or both of the spark plugs 86, 88 in one or more cylinders 12. Ion sense circuit 94 operates to selectively apply a bias voltage to at least one of spark plugs 86, 88 after spark discharge to generate a corresponding ion sense signal as shown by the representative ionization sensing signals of FIGS. 3-5 for analysis by controller 22. The ion sense signal may be used by controller 22 for various diagnostic and combustion control purposes in addition to controlling the combustion burn rate. In one embodiment, the ion sense signal is used as a feedback signal to provide an indication of combustion associated with each spark plug 86, 88 and subsequently to adjust the delay between firing of first and second spark plugs 86, 88 associated with a corresponding common cylinder 14 so that the indicated combustion burn rate approaches a desired combustion burn rate, which is determined by controller 22 in response to current ambient and operation conditions. The measured or inferred combustion burn rate indicated by the ion sense signals may be used to determine whether or not to fire the second spark plug of a cylinder, the delay or offset for firing the second spark plug after firing the first spark plug, whether to fire both spark plugs simultaneously, and/or whether to fire one or both spark plugs two or more times in a repetitive sparking mode during the same combustion phase or cycle.

Controller 22 includes code implemented by software and/or hardware to control system 10. Controller 22 generates signals to initiate coil charging and subsequent spark discharge for spark plugs 86, 88 and monitors the ionization sensing signal during the period after anticipated or expected spark discharge of the at least two spark plugs 86, 88 as shown and described with reference to FIGS. 3-5. The ionization sensing signal may be used to provide information relative to combustion burn rate in addition to detecting various conditions that may include engine knock, misfire, pre-ignition, etc. Controller 22 then controls at least one actuator affecting combustion within the corresponding cylinder to achieve a desired combustion burn rate as indicated by the ionization sensing feedback signals. Actuators affecting combustion may include actuators associated with a particular cylinder, such as spark plugs 86, 88, or charge motion control valve 76, in addition to actuators that may affect multiple cylinders, such as throttle valve 40 or EGR valve 72, for example.

Figure 2:
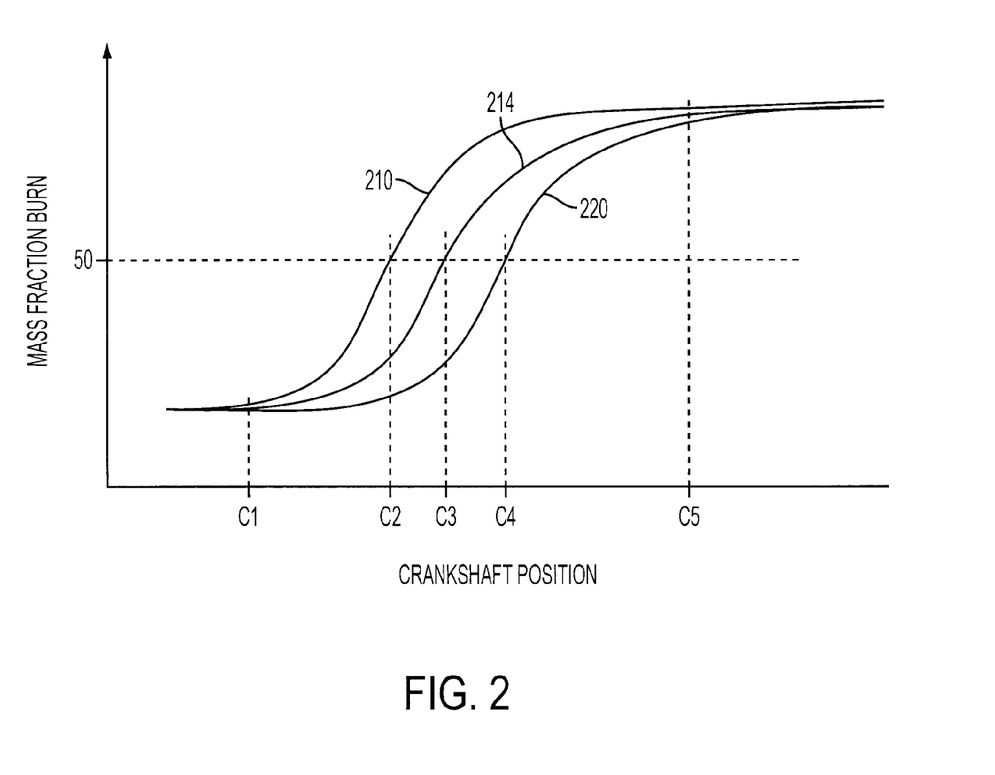
FIG. 2 illustrates representative combustion burn rates controlled using ionization sensing feedback according to embodiments of the present disclosure.

FIG. 2 illustrates three representative combined or averaged combustion burn rates in a graph of mass fraction burned as a function of crankshaft position or crank angle degrees. In the graph of FIG. 2, combustion within a particular cylinder begins at crank angle position C1 and is substantially complete at crank angle position C5. Line 210 represents a faster or higher combustion burn rate having 50% mass fraction burned at crank angle position C2. Line 214 represents a median combustion burn rate having 50% mass fraction burned at crank angle position C3, while line 220 represents a slower combustion burn rate having 50% mass fraction burned at crank angle position C4. While three combustion burn rates are illustrated, typical applications will employ a large number of curves or surfaces usually stored as look-up tables in computer readable storage media for access by controller 22 (FIG. 1) to determine a desired combustion burn rate based on one or more current operating or ambient conditions or modes. A desired combustion burn rate may be a function of another desired parameter, such as torque, for example. In one embodiment, 50% mass fraction burned should occur at eight degrees after top dead center (TDC) for best torque production (MBT). As such, the combustion burn rate is controlled to position the 50% mass fraction burned point (C2, C3, or C4) at eight degrees after TDC.

Control of one or more actuators affecting combustion may be used to alter the combustion burn rate such that the combustion burn rate as determined by the ionization sensing signals (FIGS. 3-5) approaches a desired combustion burn rate. For example, a faster combustion burn rate as represented by line 210 may be achieved by controlling first and second spark plugs 86, 88 (FIG. 1) to provide substantially simultaneous combustion (which may require offset ignition timing depending upon the particular characteristics of the air/fuel mixture and spark plug position within the cylinder). One or more spark plugs may also be repetitively fired during a single combustion cycle to increase the ignition energy provided to the cylinder and increase the combustion burn rate. Alternatively, charge motion control valve 76 may be operated to increase charge motion or swirl to increase combustion burn rate, or deactivated to decrease charge motion and lower combustion burn rate. Similarly, EGR valve 72 (FIG. 1) may be controlled to increase EGR flow and lower combustion burn rate, or decrease EGR to raise or increase combustion burn rate. Various actuators may be used in combination to achieve the desired combustion burn rate and/or to manage the combustion burn rate and various other considerations that may affect fuel economy, emissions, performance, or drivability, for example. Actuators selected during any particular condition or mode may depend upon other system control goals. For example, while EGR may be used as an actuator affecting combustion of all cylinders, combustion burn rate may be increased using one or more other actuators so that higher EGR flow may be tolerated to reduce feedgas emissions.

With continuing reference to FIG. 2, one or more actuators affecting combustion in one or more cylinders may be controlled to slow combustion to achieve a desired combustion burn rate. For example, the at least two spark plugs may be controlled to initiate combustion in a staggered or offset fashion relative to the position of each spark plug within the cylinder to achieve longer combined/average combustion as represented by line 214. This may be desirable under various operating conditions, such as during cold start to improve catalyst light-off, for example. Slower/lower combustion burn rates as generally represented by line 220 may be provided by firing a single spark plug or supplying lower ignition energy for example.

Figure 3:
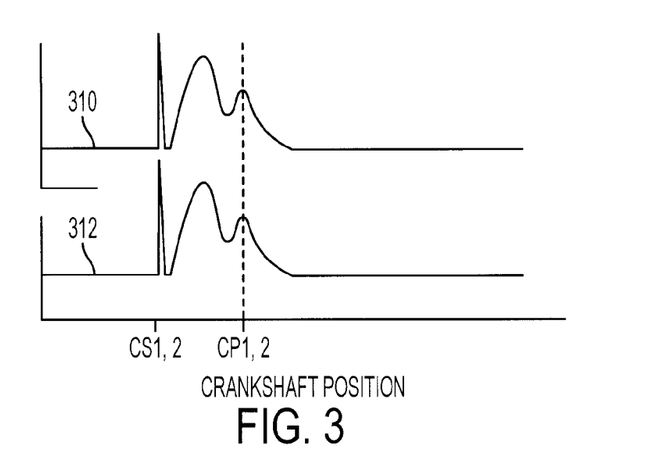
FIG. 3 illustrates substantially simultaneous combustion based on ionization sensing signals for two spark plugs in a corresponding cylinder to provide a relatively faster/higher combustion burn rate according to embodiments of the present disclosure.
Figure 4:
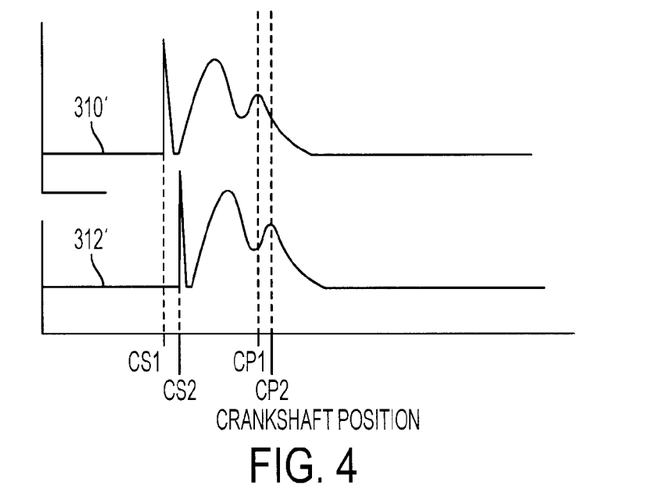
FIG. 4 illustrates staggered or offset combustion based on ionization sensing signals for two spark plugs in a corresponding cylinder to provide a relatively slower/lower combustion burn rate according to embodiments of the present disclosure.
Figure 5:
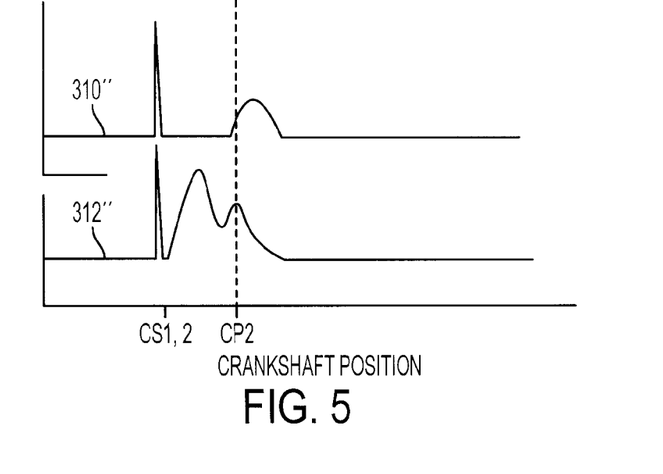
FIG. 5 illustrates combustion associated with a single plug firing based on ionization sensing signals for two spark plugs in a corresponding cylinder according to embodiments of the present disclosure.

FIGS. 3-5 are representative ionization sensing signals used to determine or infer a combustion burn rate. Real-time acquired ion sense signals for each engine cylinder for each spark plug or other ionization sensor are gathered and stored by controller 22 (FIG. 1). For each combustion event, at each spark plug, the information for the most recent engine cylinder firing may be processed to identify features such as peak values, signal integral areas, derivative or slope values, statistics (such as maximum, minimum, mean, or variability) based on these values, or crankshaft locations of any of the values or statistics that may be used to determine combustion burn rate in addition to many other combustion characteristics and diagnostics. The ion signals for each ignition coil in a shared cylinder are sampled at a given time or crankshaft degree intervals relative to expected ignition timing. These curve features, time-based, and/or angle-based measurements can be averaged to remove statistical random components of the ion combustion signal. As used herein, ionization sensing signals may include the signal corresponding to an individual combustion event, or to a statistically averaged signal for a particular sensor, cylinder, cycle, etc. Generally, sufficient numbers of samples, or cylinder event series of samples, are used to ensure statistical significance for all measurements. These measurements may be collected in one group or in a one-in, one-out, sliding window form. The data elements representing one or more series of measurements may be processed to produce a regression equation once the sample size is appropriate for the desired statistical significance. These regression equations and/or transfer functions can then be used to estimate either historical or instantaneous engine combustion stability. The regression equation and or transfer function may be periodically updated for the desired level of accuracy. One skilled in the art will also recognize that other systems such as neural networks could be utilized to ascertain combustion information from the ionization sensing signals. When the engine operating time has been sufficient to allow for valid combustion stability measurements by means other that ionization sensing, these values can be used to calibrate the accuracy of the combustion stability estimate based on ionization sensing.

The regression equations, transfer functions, combustion stability estimates, and corrections based upon these estimates can all be adaptively stored for subsequent use, with resets at appropriate vehicle events, such as refueling, altitude changes, etc. FIG. 3 illustrates representative ionization sensing signals 310, 312 associated with spark plugs 86, 88, respectively (FIG. 1), during a representative combustion cycle. A spark ignition signal with the same spark advance and ignition energy for both spark plugs occurs substantially simultaneously at crankshaft position CS1,CS2. The substantially aligned ionization signal peaks at crankshaft position CP1, CP2 indicated that combustion around each spark plug progressed substantially synchronously or simultaneously and would be indicative of a fast combustion burn rate as represented by line 210 of FIG. 2. However, in the example illustrated in FIG. 5, ionization feedback signals 310" and 312" indicate that the spark plug advance and ignition energy are synchronized at crankshaft position CS1,CS2 in an attempt to provide a synchronous burn and faster combustion burn rate. Ionization signal 312" indicates a combustion peak at crankshaft position CP2, but signal 310" indicates that a corresponding plug firing command did not result in associated combustion surrounding that spark plug location. This information may be used by controller 22 (FIG. 1) to modify subsequent firing to produce a desired combustion profile.

To provide a lower combustion burn rate or slower combustion, the combustion associated with the first and second spark plugs may be offset or staggered relative to one another as indicated by the ionization sensing signal of FIG. 4. In this example, the first spark plug is fired at crankshaft position CS1 with the second fired at CS2 resulting in combustion peaks occurring at CP1 and CP2, respectively. The ionization sensing signal provides feedback for the ignition signal commands to provide a measured or inferred combustion burn rate. The information provided by the ionization sensing signal relative to the delay between the spark (CS1,CS2) and the corresponding peak in combustion (CP1,CP2) can be used by the controller to adjust or adapt the ignition timing for a particular spark plug or cylinder such that the measured or inferred combustion burn rate approaches the desired combustion burn rate.

In the example of FIG. 5, the ionization sensing signal 310″ indicates delayed or no combustion associated with one of the spark plugs. The engine controller could then use this information to subsequently repetitively fire the spark plug to improve the burn to achieve a desired combustion burn rate. Other representative control examples may include repetitively striking one, or both spark plugs with each having a different number of re-strikes, for example. One skilled in the art will recognize that in-cylinder motion control devices may be used to change the combustion characteristics by modifying the flow of the air/fuel charge within the cylinder. Such devices may include variable valve timing devices and charge motion control valves, for example. The air/fuel charge may be stratified in nature and certain areas of the combustion chamber near one plug or the other may have different local air/fuel ratios, and motion, that may require different spark energy to ignite the mixture. These differences may be inferred from the ionization signal feedback as generally represented by the signals in FIGS. 3-5 and many others. The information obtained from the ionization sensing signals is used by the engine controller to schedule spark advance, and whether spark plugs within a particular cylinder should be fired simultaneously, offset in time or crank angle domain, or fired multiple times for one or both spark plugs to achieve the desired combustion burn rate.

Figure 6:
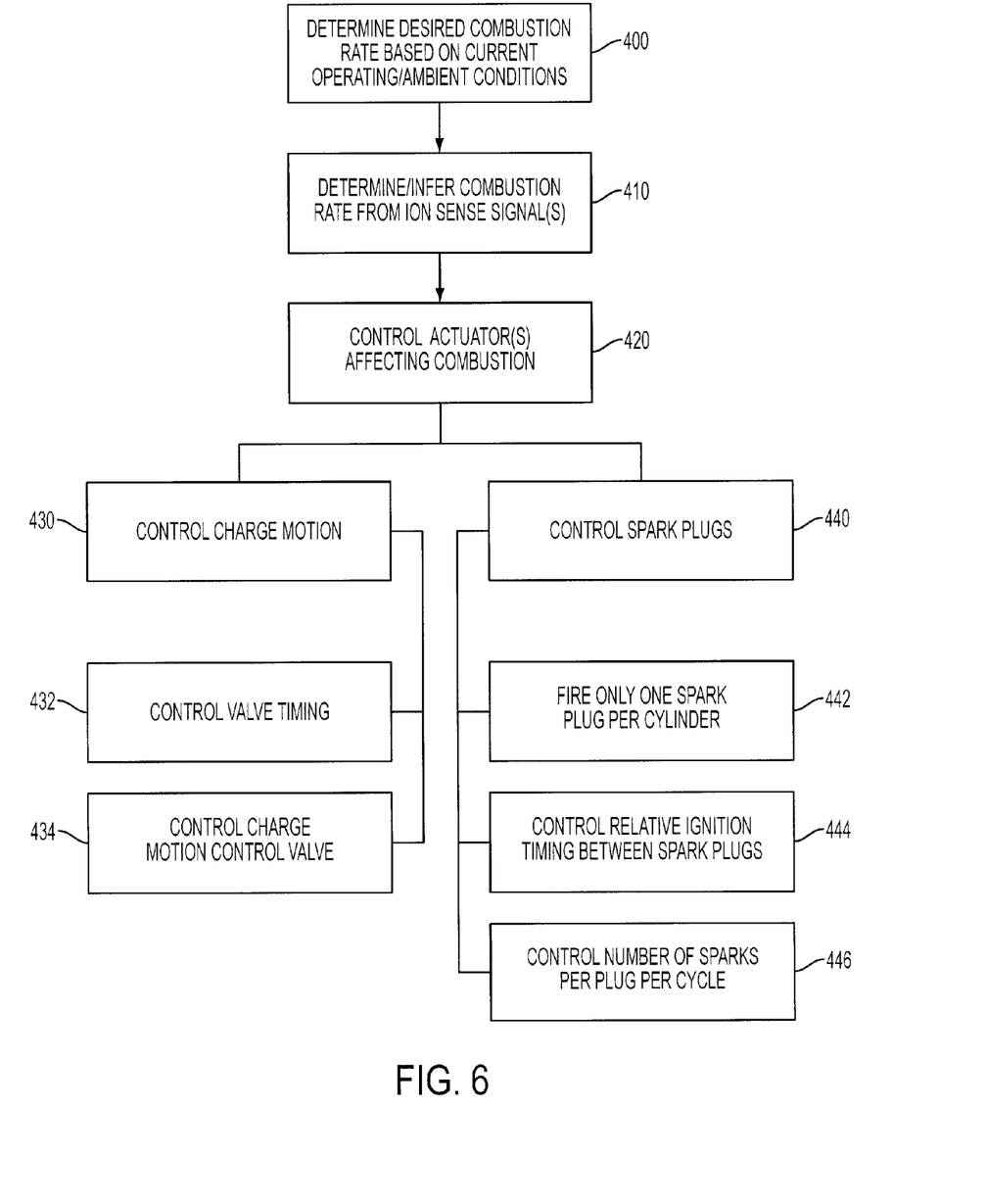
FIG. 6 is a flow chart illustrating operation of a system or method for controlling combustion using ionization sensing feedback according to embodiments of the present disclosure.

FIG. 6 is a flow chart illustrating operation of one embodiment of a system or method for controlling combustion burn rate in an internal combustion engine having at least two spark plugs per cylinder according to the present disclosure. As those of ordinary skill in the art will understand, the functions represented by the block diagram may be performed by software and/or hardware. Depending upon the particular processing strategy, such as event-driven, interrupt-driven, etc., the various functions may be performed in an order or sequence other than illustrated in the Figures. Similarly, one or more steps or functions may be repeatedly performed, although not explicitly illustrated. In one embodiment, the functions illustrated are primarily implemented by software, instructions, or code stored in a computer readable storage medium and executed by a microprocessor-based computer or controller to control operation of the engine.

A desired combustion burn rate is determined based on current engine operating and/or ambient conditions as represented by block 400. Current operating and ambient conditions may be measured or inferred from various engine and/or vehicle sensors. Block 400 may also determine a current operating mode, such as a cold start mode, evaporative emissions purge mode, fuel economy mode, etc. The actual combustion burn rate for one or more cylinders is then determined or inferred from the corresponding ionization sense signal or signals as represented by block 410. As previously described, the combustion burn rate may be an average over a number of combustion events and/or cylinders. One or more actuators affecting combustion within a selected cylinder are then controlled such that the measured or inferred combustion burn rate approaches the desired combustion burn rate to effect feedback control of the combustion burn rate based on the ionization sensing signal feedback.

Representative actuators that may be controlled to affect combustion within the selected cylinder or cylinders include actuators that control charge motion as represented by block 430, and/or actuators that control the spark plugs as represented by block 440. Charge motion may control local combustion burn rates relative to the at least two spark plugs and may include control of valve timing as represented by block 432 for systems having variable valve timing devices, or actuation of charge motion control valves as represented by block 434, for example. Similarly, spark plugs may be controlled by firing only one spark plug per cylinder as represented by block 442 to reduce the combustion burn rate. The combustion burn rate may also be affected by changing ignition timing of the first spark plug relative to ignition timing of the second spark plug of a selected cylinder to change the combustion burn rate as represented by block 444. The timing of the first and second spark plug firings may be offset relatively to one another to either offset local combustion and reduce combustion burn rate, or to synchronize combustion and increase combustion burn rate where each spark plug has a different ignition delay between a commanded spark and initiation of combustion. Other spark plug control strategies may change the number of sparks per plug per combustion cycle as represented by block 446. For example, repetitive sparking may be used on one plug of a cylinder to increase combustion associated with that plug, or for both plugs to increase the combustion burn rate. Each spark plug may be repetitively sparked a different number of times to achieve the desired combustion burn rate as determined or inferred from the ionization sensing signals associated with respective spark plugs.

As previously described and illustrated with reference to FIGS. 1-6, the present disclosure provides a method for controlling an internal combustion engine having at least two spark plugs per cylinder that controls at least one actuator affecting combustion within at least one cylinder so that combustion burn rate of a selected cylinder as determined by ionization sensing feedback from associated spark plugs approaches a desired combustion burn rate determined based on current operating and/or ambient conditions and/or modes.

As such, the previously described embodiments have various advantages. For example, the systems and methods of the present disclosure can provide individual control of each spark plug associated with a common cylinder to more accurately control the combustion process and individual ionization sensing signals to achieve a desired combustion burn rate. The systems and methods of the present disclosure use ionization sensing feedback to more accurately control combustion within individual cylinders to manage fuel economy, performance, and emissions with acceptable NVH.

While the best mode has been described in detail, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments discussed herein that are described as less desirable than other embodiments or prior art implementations with respect to one or more characteristics are not outside the scope of the disclosure and may be desirable for particular applications.

What is claimed is:

1. A multiple cylinder internal combustion engine comprising:
   a controller in communication with an actuator and a first and a second spark plug associated with each cylinder and controlling the actuator such that combustion burn rate indicated by ionization sensing feedback approaches a desired combustion burn rate;
   wherein the controller changes ignition timing of the first spark plug relative to ignition timing of the second spark plug to control the combustion burn rate.

2. An engine, comprising:
   a controller in communication with at least one actuator and at least two spark plugs associated with each cylinder and controlling the actuator such that combustion burn rate indicated by ionization sensing feedback approaches a desired combustion burn rate, wherein the at least one actuator comprises a charge motion control device.

3. The engine of claim 1 wherein the actuator comprises at least one of the first and second spark plugs.

4. The engine of claim 1 wherein the controller reduces time between firing of the first and second spark plugs to increase combustion burn rate.

5. The engine of claim 4 wherein the controller offsets firing of the first spark plug relative to the second spark plug to decrease combustion burn rate.

6. The engine of claim 4 wherein the controller fires only one of the first and second spark plugs to decrease combustion burn rate.

7. The engine of claim 4 wherein the controller repetitively fires at least one of the first and second spark plugs during a single combustion cycle to increase combustion burn rate.

8. The engine of claim 7 wherein the controller repetitively fires the first and second spark plugs using a different number of repetitive firings for each spark plug to control the combustion burn rate.

9. The engine of claim 1 wherein the controller determines ignition timing for each spark plug based on a corresponding delay between ignition timing and combustion as determined by the ionization sensing feedback for at least one previous combustion cycle.

10. A computer readable storage medium having code representing instructions executable by a microprocessor based controller to control combustion within a multiple cylinder internal combustion engine having at least two spark plugs per cylinder, the computer readable storage medium comprising:
    code that actuates an actuator affecting combustion within a cylinder based on ionization sensing feedback of a previous combustion cycle to control combustion burn rate within the cylinder;
    wherein the code controls relative ignition timing between the at least two spark plugs to control combustion burn rate.

11. The computer readable storage medium of claim 10 wherein the code comprises code that controls a charge motion control device such that combustion burn rate determined by ionization sensing feedback approaches a desired combustion burn rate selected in response to current engine operating conditions.

12. The computer readable storage medium of claim 10 wherein the code controls ignition timing of the at least two spark plugs to more closely align combustion associated with each spark plug to increase the combustion burn rate.

13. The computer readable storage medium of claim 10 wherein the code controls ignition timing of the at least two spark plugs to offset combustion associated with each spark plug to decrease the combustion burn rate.

14. A method for controlling an internal combustion engine having at least two spark plugs per cylinder, the method comprising:
    controlling an actuator affecting combustion within a cylinder so that a combustion burn rate of a selected cylinder as determined by ionization sensing feedback from associated spark plugs approaches a desired combustion burn rate;
    wherein controlling the actuator comprises controlling relative ignition timing between first and second spark plugs associated with the selected cylinder to control the combustion burn rate.

15. The method of claim 14 wherein ignition timing is controlled to synchronize combustion associated with first and second spark plugs of the selected cylinder to increase the combustion burn rate.

16. The method of claim 14 wherein ignition timing is controlled to offset combustion associated with first and second spark plugs to decrease the combustion burn rate.

17. The method of claim 16 wherein controlling the actuator comprises firing only one of the at least two spark plugs to decrease the combustion burn rate.

18. A method for controlling an engine having at least two spark plugs per cylinder, comprising:
    controlling at least one actuator affecting combustion within a cylinder so that a combustion burn rate of a selected cylinder as determined by ionization sensing feedback from associated spark plugs approaches a desired combustion burn rate, wherein controlling comprises controlling at least one actuator to increase charge motion within the selected cylinder to increase combustion burn rate.

* * * * *